US010062897B2

(12) United States Patent
Stern et al.

(10) Patent No.: US 10,062,897 B2
(45) Date of Patent: *Aug. 28, 2018

(54) BATTERY ELECTRODE AND A METHOD FOR PRODUCING SAME

(75) Inventors: Rainer Stern, Ulm (DE); Michael Kasper, Illertissen (DE)

(73) Assignee: ZENTRUM FUER SONNENENERGIE- UND WASSERSTOFF-FORSCHUNG BADEN-WUERTTEMBERG GEMEINNUETZIGE STIFTUNG (DE)

( * ) Notice: Subject to any disclaimer, the term of this patent is extended or adjusted under 35 U.S.C. 154(b) by 442 days.

This patent is subject to a terminal disclaimer.

(21) Appl. No.: 13/990,331

(22) PCT Filed: Nov. 25, 2011

(86) PCT No.: PCT/EP2011/005946
§ 371 (c)(1),
(2), (4) Date: May 29, 2013

(87) PCT Pub. No.: WO2012/072222
PCT Pub. Date: Jun. 7, 2012

(65) Prior Publication Data
US 2013/0302674 A1    Nov. 14, 2013

(30) Foreign Application Priority Data

Nov. 29, 2010   (DE) .................. 10 2010 062 143

(51) Int. Cl.
| H01M 4/70 | (2006.01) |
| H01M 4/04 | (2006.01) |
| H01M 2/26 | (2006.01) |
| H01M 10/04 | (2006.01) |
| H01M 10/0585 | (2010.01) |
| H01M 10/052 | (2010.01) |

(52) U.S. Cl.
CPC .......... *H01M 4/0404* (2013.01); *H01M 2/26* (2013.01); *H01M 2/266* (2013.01); *H01M 4/0402* (2013.01); *H01M 4/70* (2013.01); *H01M 10/04* (2013.01); *H01M 10/0585* (2013.01); *H01M 10/052* (2013.01)

(58) Field of Classification Search
None
See application file for complete search history.

(56) References Cited

U.S. PATENT DOCUMENTS

| 5,766,798 | A | 6/1998 | Bechtold et al. |
| 6,151,338 | A | 4/2000 | Miyazaki et al. |
| 6,162,264 | A | 12/2000 | Miyazaki et al. |
| 6,187,473 | B1 | 2/2001 | Tamezane et al. |
| 8,679,677 | B1 * | 3/2014 | Tamaki et al. ............. 429/209 |
| 2003/0228517 | A1 | 12/2003 | Holl et al. |
| 2005/0208354 | A1 | 9/2005 | Hahn et al. |
| 2006/0035152 | A1 | 2/2006 | Nishimura et al. |
| 2007/0139001 | A1 | 6/2007 | Hahn |
| 2010/0028767 | A1 | 2/2010 | Inose et al. |

FOREIGN PATENT DOCUMENTS

| DE | 10224452 C1 | 11/2003 |
| DE | 10341355 A1 | 7/2005 |
| DE | 102008053595 A1 | 10/2008 |
| DE | 102008041713 A1 | 3/2010 |
| EP | 0766327 A1 | 4/1997 |
| EP | 0825659 A2 | 2/1998 |
| EP | 0924783 A1 | 4/2003 |
| EP | 1359633 A1 | 11/2003 |
| EP | 1403943 A2 | 3/2004 |
| EP | 1596459 A1 | 11/2005 |
| JP | H-08-255611 A | 10/1996 |
| JP | H-09-204911 A | 8/1997 |
| JP | H-10-064526 A | 3/1998 |
| JP | H-10-255772 A | 9/1998 |
| JP | H-11-007939 A | 1/1999 |
| JP | 2000243376 A | 2/1999 |
| JP | 1999149914 A | 6/1999 |
| JP | H-11-167916 A | 6/1999 |
| JP | 2000149911 A | 5/2000 |
| JP | 2000208129 A | 7/2000 |
| JP | 2001-043848 | * 2/2001 |
| JP | 2002216740 A | 8/2002 |
| JP | 2002246009 A | 8/2002 |
| JP | 2002279964 A | 9/2002 |
| JP | 2002343342 A | 11/2002 |
| JP | 2003068278 A | 3/2003 |
| JP | 2003308833 A | 3/2003 |
| JP | 2003187763 A | 7/2003 |
| JP | 2010034009 A | 2/2010 |
| WO | WO2005036689 A2 | 4/2005 |
| WO | WO2008011061 A1 | 1/2008 |
| WO | WO2009055529 A1 | 4/2009 |
| WO | WO2010105917 A1 | 9/2010 |
| WO | WO2011060982 A1 | 5/2011 |

OTHER PUBLICATIONS

JP 2001-043848-Translation.*
ISA/EP, International Search Report of corresponding PCT Appl. No. PCT/EP2011/005946, completed Apr. 12, 2012 and dated Apr. 19, 2012 and translation thereof (total 14 pages).
Korean Intellectual Property Office (KIPO), Office Action from KR Patent Application No. 10-2013-7017145 (PCT/EP2011/005946) dated Jan. 29, 2015 with English translation.
Chinese Patent Office (SIPO), Office Action from CN Patent Application No. 201180055994.1 (PCT/EP2011/005946) dated Mar. 13, 2015 with English translation.

(Continued)

*Primary Examiner* — Ladan Mohaddes
(74) *Attorney, Agent, or Firm* — Barclay Damon, LLP

(57) ABSTRACT

In order to allow for a compact configuration of a battery with an increased energy density/volume ratio together with low production costs, the invention specifies a battery electrode and a method for producing same, wherein an arrester region is arranged on a collector substrate such that it is predominantly surrounded by a coating film.

10 Claims, 7 Drawing Sheets

(56) References Cited

OTHER PUBLICATIONS

Korean Intellectual Property Office (KIPO), Final Office Action from KR Patent Application No. 10-2013-7017145 (PCT/EP2011/005946) dated Oct. 29, 2015 with English translation.
European Patent Office (EPO), Office Action/Communication under 94.3, from EP Application No. 11 788072.4-1359, dated Dec. 18, 2015 with English translation.
Chinese Patent Office (SIPO), Third Office Action from CN Patent Application No. 201180055994.1 (PCT/EP2011/005946) dated Jan. 4, 2016 with English translation.
Japanese Patent Office (JPO), Final ($2^{nd}$) Office Action from JP Patent Application No. JP 2013-540270, dated Mar. 24, 2015 with English Translation.
Japanese Patent Office (JPO), First Office Action from JP Patent Application No. JP 2013-540270, dated Oct. 2014 with English Translation.
Japanese Patent Office (JPO), Second Office Action from JP Patent Application No. JP 2013-540270, dated Aug. 25, 2015 with English Translation.
Japanese Patent Office (JPO), Notification of Third Party Submission of Prior Art dated Oct. 20, 2015 in JP Patent Application No. JP 2013-540270, with English Translation.

\* cited by examiner

BATTERY ELECTRODE AND A METHOD FOR PRODUCING SAME

CROSS-REFERENCE TO RELATED APPLICATIONS

This application claims priority to International Patent Application No. PCT/EP2011/005946 filed Nov. 25, 2011, which claims priority to German Patent Application No. 10-2010-062-143.9, filed Nov. 29, 2010.

TECHNICAL FIELD

The invention relates to a battery electrode and to a method for producing same.

BACKGROUND TO THE INVENTION

In general, a battery indicates both non-rechargeable primary cells and rechargeable secondary cells (also called rechargeable batteries). Batteries are classified on the basis of the underlying chemical redox reaction, the materials used, the electrical values (for example voltage or capacitance) or the geometric or structural design. Examples include alkaline-manganese batteries, zinc-carbon batteries or lithium batteries. A distinction is also drawn between winding cells and stacked batteries in batteries, depending on their inner construction. In the case of a winding cell, the electrode and separator layers which are arranged one above the other are wound up in a spiral manner and installed, for example, in a round battery with a cylindrical housing. In the case of a stacked battery however, a plurality of electrode and separator layers are alternately stacked one above the other.

FIG. 1 shows, by way of example, a stacked battery. As shown in FIG. 1, an anode 10 and a cathode 20 are alternately arranged in the battery, wherein a separator 30 is arranged between the anode 10 and the cathode 20 in each case in order to physically and electrically separate the two electrodes. However, the separator 30 has to be permeable to ions which cause the conversion of the stored chemical energy into electrical energy. Microporous plastics or nonwovens which are composed of glass fiber or polyethylene are usually used for separators 30. The anodes 10 are connected to one another in their arrester regions 40, as are the cathodes 20, with the result that all electrodes of the same kind in a battery are interconnected. A connection lug 50 (see FIG. 2B) for the cathodes 20 and the anodes 10 is mounted in the arrester regions 40 in each case, said connection lug being connected to a corresponding outer voltage pole of the battery.

FIG. 2A shows a plan view of a cathode 20 with an arrester region 40. The cathodes 20 are connected to one another in the arrester regions 40 of the cathodes 20 which are arranged one above the other. As shown in FIG. 2B, the connection lug 50 is mounted on the arrester regions 40 which are connected to one another, said connection lug being in contact with the negative pole of the battery after the battery is assembled.

Battery electrodes are usually prefabricated as bulk or rolled material from which a desired electrode shape is cut out during production of a battery. As shown in FIG. 3, the electrode material comprises a collector substrate 60 which is provided with a coating film 70. In this case, the electrode material has one or more uncoated arrester regions 40 which are required later in the assembled state in order to discharge voltage or current to the outside. A plurality of electrodes of the same kind are connected to one another at, and a metal connection lug 50 is mounted on, the arrester regions 40. When the collector substrate 60 is coated on both sides, arrester regions 40 are therefore also formed on both sides. In this case, the arrester regions do not necessarily have to be formed opposite one another but can be offset in relation to one another, as shown in FIG. 3.

FIGS. 4A and 4B show methods for producing an electrode material by means of a slot die system 300. An ink-like coating film 70 is applied on the strip-like collector substrate 60. This application process can be performed either by discontinuous, intermittent coating, wherein an uncoated arrester region 40 is formed by regular interruption in the coating as shown in FIG. 4A, or by continuous coating, as shown in FIG. 4B. However, forming relatively complex arrester regions using these methods is very complicated. Therefore, masking steps are occasionally used. As an alternative, arrester regions 40 can be exposed on a collector substrate 60 by brushing or similar methods.

After coating, the electrode material is calendered in order to compress the coating film and to eliminate cavities which are produced when the coating film 70 is drying. The finished electrode material can then be rolled up and stored until further processing. A desired shape, which is different depending on the type of battery or shape of the battery, is cut out or stamped out of the electrode material in order to produce a battery. When the battery electrode is cut out, it is additionally necessary to ensure that an arrester region 40 must be present. An example of a rectangular electrode shape with an arrester region 40 is shown in FIG. 2A.

FIG. 5 shows a flowchart which is used to illustrate the production process of a battery, for example a winding cell or a stacked battery. First, the collector substrate 60 is coated with the coating film 70, for example using an intermittent method (S10), wherein a plurality of uncoated arrester regions 40 are formed by interruption or discontinuation when applying the ink-like coating. The electrode material is then calendered (S20). A desired electrode shape can then be cut out or stamped out of the electrode material (S30), wherein the stamped-out shape has to have an arrester region 40. These steps are performed both when producing the anode 10 and when producing the cathode 20. Next, the stamped-out electrodes are arranged one above the other (S40) such that an anode 10 and a cathode 20 with a separator 30 therebetween are arranged alternately in succession (see FIG. 1). In this case, the arrester regions 40 of the cathodes 20 and the arrester regions 40 of the anodes 10 are in each case arranged one above the other and are connected to one another. A connection lug 50 is then mounted on said arrester regions (S50). In this case, the number of anodes 10 and cathodes 20 which are arranged one above the other can vary depending on the type and property of the battery. After the electrode arrangement is complete, the electrode arrangement is inserted into a housing and the connection lugs 50 are connected to the outer voltage poles of the housing (S60). In the case of a winding cell, the electrode arrangement is also wound up in a spiral manner and inserted into the housing in this state. After the electrolyte is introduced (S70), the cell is then sealed (S80) and finally formed (S90).

However, the following problems are encountered in the conventional methods for producing battery electrodes. For example, the production of uncoated arrester regions by masking steps or brushing away the coating is very complex and expensive. In the alternative production method by intermittent or continuous coating with the aid of a slot die system however, the possible shapes and arrangements of the arrester regions on the electrode material are greatly restricted. In view of the various fields of use of batteries, in particular in design products such as mobile telephones, laptops or cars, however, flexibility in respect of the configuration of the battery electrodes is increasingly required. In this case, the trend toward relatively small devices poses a particular challenge to battery production. Firstly, batteries with relatively small dimensions therefore have to be developed, and secondly complex shapes are often required in order to make the most efficient use of the interior of a device as possible. Furthermore, it is difficult to produce regular and clean edge regions between the coating region and the arrester region in the case of an intermittent coating method.

Furthermore, it is difficult and expensive to realize a variety of shapes of the electrodes with the conventional methods. For reasons of cost, a rolled material is usually used as the electrode material, possible positions of the uncoated arrester region 40 in relation to the coating film 70 being fixedly defined in said rolled material. As a result however, the degree of freedom of design for the electrode shape is severely restricted because each electrode has to have an arrester region 40. In addition, a large amount of excess electrode material which has to be disposed of is produced when the desired electrode shape together with the arrester region 40 is cut out. If, for example, small electrodes are cut out such that they contain an arrester region 40, regions of the coated substrate which is situated between successive arrester regions 40 can no longer be used when there is a large distance between said successive arrester regions. As a result, material consumption is increased and the production method is more expensive. Furthermore, a dedicated stamping die for stamping out the desired shape has to be created for each desired electrode shape. However, these stamping dies are very expensive on account of the high demands made on cutting quality.

In the conventional production methods, the arrester region 40 is formed beforehand by a coated electrode region in order to mount the connection lug 50 on said arrester region and to connect electrodes of the same kind to one another. However, this leads to unutilized space in the battery which is not filled with active electrode material. As a result, the size of the battery is unnecessarily increased and/or an outer shape of the battery is fixed.

Furthermore, the arrester regions 40 can be easily contaminated in the conventional production methods or else during storage. Impurities can reach the arrester regions 40 in the case of a calendering process in particular. This has an adverse effect on the quality of an electrical contact between electrodes of the same kind and between the electrodes and an associated connection lug 50. Since the arrester regions 40 are additionally formed before the calendering process during production of the electrode material, calendering is made more difficult on account of the non-uniformly thick structure. In addition, the arrester region 40 which is formed by conventional methods may be poorly defined, wherein particularly an edge region of the arrester region 40 can be formed in an inaccurate and non-uniform manner.

SUMMARY OF THE INVENTION

The object of the present invention is therefore to specify a battery electrode and a production method for said battery electrode, wherein a volumetric energy density of a battery can be increased by compact configuration of the battery electrode at low production costs.

The object is achieved by the features of the independent claims.

The invention is based on the idea of arranging an uncoated region, which operates as an arrester region, on a collector substrate of a battery electrode such that it projects inwardly into a coated region of the collector substrate or is arranged within the coated region. When the uncoated arrester region projects inwardly into the coated region, an entire circumferential length of the coated region is greater than in the case of a battery electrode with a protruding arrester region. At the same time, an external edge of the uncoated region, that is to say an edge which adjoins an edge of the battery electrode, is minimized. In this way, an unutilized space in a battery which is created by an arrester region which protrudes from the battery electrode can be avoided and an energy density can be increased with the battery volume remaining constant.

One aspect of the present invention specifies a battery electrode which comprises a collector substrate, a coating film which is formed on the collector substrate, and an arrester region, wherein a large portion of the arrester region is surrounded by the coating film. The arrester region can have a circumferential region which coincides with an outer edge of the battery electrode, wherein, however, the arrester region predominantly adjoins the active region of the battery electrode, which active region is covered by the coating film, that is to say the arrester region is surrounded at least over half its outer circumference by the coating film. As an alternative, the arrester region can, however, also be situated completely in the coated region of the collector substrate, with the result that the arrester region, over its entire circumference, adjoins the coating film. In this way, an inactive region or dead volume can be reduced when the battery is assembled, with the result that a capacity and a volumetric energy density is increased given the same battery size.

In one exemplary embodiment, the arrester region is formed on the battery electrode in any desired shape, for example in a substantially circular, annular, rectangular or triangular manner. When both the arrester region and the battery electrode have a rectangular shape, the arrester region can be arranged in a corner of the battery electrode, with the result that two sides of the arrester region adjoin the coating film. As an alternative, the arrester region can adjoin the outer edge of the battery electrode only by way of one side, with the result that three sides of the arrester region are surrounded by the coated region of the battery electrode.

The coating film is preferably formed on both sides of the collector substrate in order to increase an active area of the battery electrode. In this case, in each case at least one arrester region can be formed on both sides of the collector substrate. When arrester regions are formed on both sides of the collector substrate, in each case two arrester regions are preferably situated opposite one another, with the result that battery electrodes of the same kind can be easily connected to one another at the arrester region, for example by a welded contact. As an alternative, the arrester regions can be arranged offset in relation to one another on both sides of the collector substrate.

In a preferred exemplary embodiment, the arrester region is produced by laser ablation of the coating film, with the result that the collector substrate situated beneath it is exposed. In this way, the coating film can be produced over a large surface area or substantially completely and continuously on the collector substrate without an arrester region having to be kept open. In addition, the coating film can be formed over a large surface area on one or on both sides of the collector substrate, with the result that the coated substrate has a uniform thickness. Owing to the uniform thickness of the coated collector substrate, a calendering process is further simplified and can be carried out with better quality. Furthermore, the arrester region can then be formed immediately before contact is made with the arrester region, with the result that a fresh and clean surface is available for making contact. Therefore, the occurrence of impurities can be avoided, it being possible for these impurities to present a serious danger to a finished battery and cause the formation of dendrites with the resulting short circuit, for example abrasive particles or coating residues which are produced during brushing. On account of using a laser to expose the arrester regions, the arrester regions can also be produced on the coated collector substrate in any desired shape and at any desired position with clean and uniform edges. This provides absolute freedom of design and the option of producing arrester structures which are optimized in respect of surface area. The outer shape of the battery electrode can likewise be cut out with a laser. This saves on a further tool and/or a further working step and, in particular, expensive stamping dies. As a result, it is possible to produce any desired electrode shapes in a cost-effective manner even in low quantities. Therefore, two different working steps can be carried out with a considerably saving in time using a single laser, as a result of which changing over of the electrode material to be processed or of the tool can be dispensed with.

Furthermore, at least one cutout can be formed in the battery electrode. The cutout in an electrode preferably corresponds to an arrester region which is formed on an electrode of a different kind, so that the arrester regions of the electrodes of the same kind which are arranged one above the other can be connected to one another through the other electrodes in the case of an alternating electrode arrangement. This may be advantageous, for example, when the arrester region of an electrode projects inwardly into a coated electrode region or is completely surrounded by said coated electrode region. When the battery electrode is cut out by means of laser cutting, the at least one cutout can likewise be cut out with the aid of the laser in order to optimize a method sequence.

Any suitable laser system, for example cutting or engraving laser systems, can be used for removing the material by means of laser ablation or for laser cutting. On account of the high edge quality and cutting precision in respect of cut guidance and penetration depth, high-quality arrester regions can be produced. Furthermore, by virtue of the use of ultra-short laser pulses, the energy input can be reduced, with the result that thermal loading of the electrode material is kept low. Since suitable laser systems are comparable to slot die systems in respect of cost, high purchase costs are not incurred.

A further aspect of the present invention specifies a battery which contains at least one battery electrode according to one of the above exemplary embodiments. Since the battery electrode can be designed to be relatively compact by forming an arrester region which is predominantly surrounded by a coating film, and therefore has a relatively low space requirement, a volumetric energy density of the battery can be increased.

A further aspect of the present invention specifies a method for producing a battery electrode, wherein a coating film is applied on a collector substrate. The coating film is then removed in an arrester region such that a circumference of the arrester region is predominantly surrounded, or at least half of the circumference of the arrester region is surrounded, by the coating film. Since the arrester region is formed by removing the coating film, the substantially completely coated collector substrate can be stored as electrode material without particular precautions and the arrester region can be formed only immediately before contact is made with the arrester region. In this way, impurities and chemical changes in the surface are avoided and a contact resistance in the arrester region is reduced. Furthermore, in this method, the coating film can be formed over a large surface area and/or virtually completely on an entire surface of the collector substrate. The coating film is possibly also formed on both sides of the collector substrate. Continuous coating technologies, for example doctor blade, comma bar and kiss coating, are advantageously used, with the result that the production costs can be reduced. Furthermore, the coated collector substrate has a uniform thickness, as a result of which a calendering process is simplified and improved.

In a preferred exemplary embodiment, the coating film in the arrester region is removed with a laser. In this case, a thin layer of the collector substrate can be removed in the arrester region at the same time in a preferred exemplary embodiment in order to improve a surface condition in the arrester region. The use of laser ablation for forming the arrester region increases the degree of freedom of design in the configuration of the battery electrode and the arrester region and allows for individual manufacture.

BRIEF DESCRIPTION OF THE FIGURES

In the Figures

DETAILED DESCRIPTION OF THE INVENTION

Figure 1:
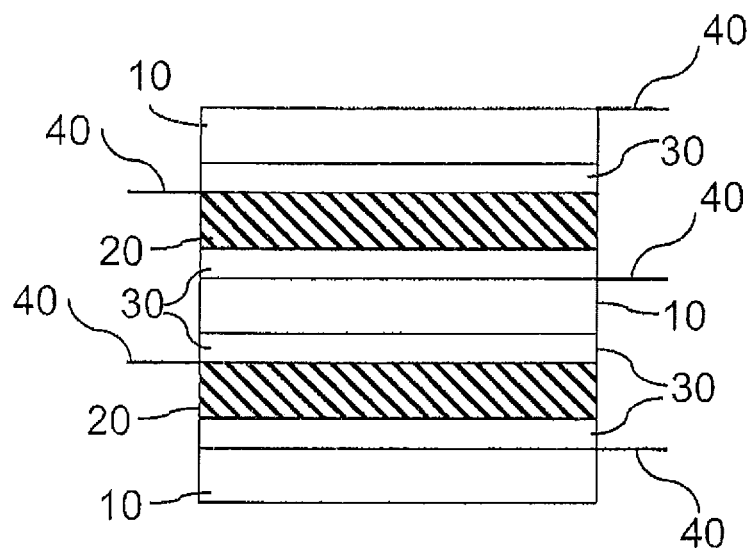
FIG. 1 shows a schematic sectional view of an electrode arrangement in a conventional battery.
Figure 2A:
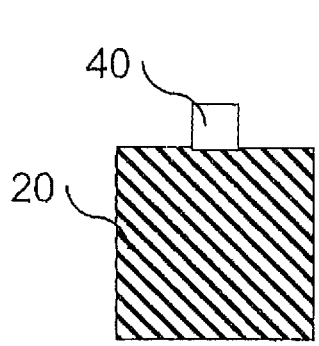
FIGS. 2A and 2B show a plan view of a conventional battery electrode.
Figure 2B:
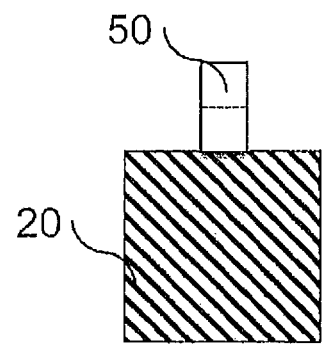
Figure 3:
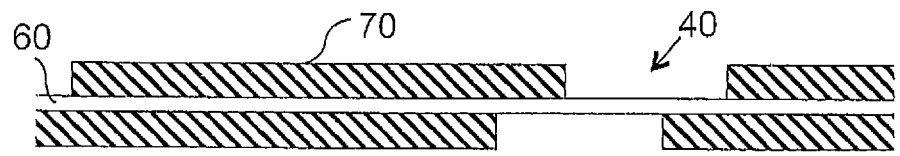
FIG. 3 shows a sectional view of a conventional electrode material.
Figures 4A, 4B:
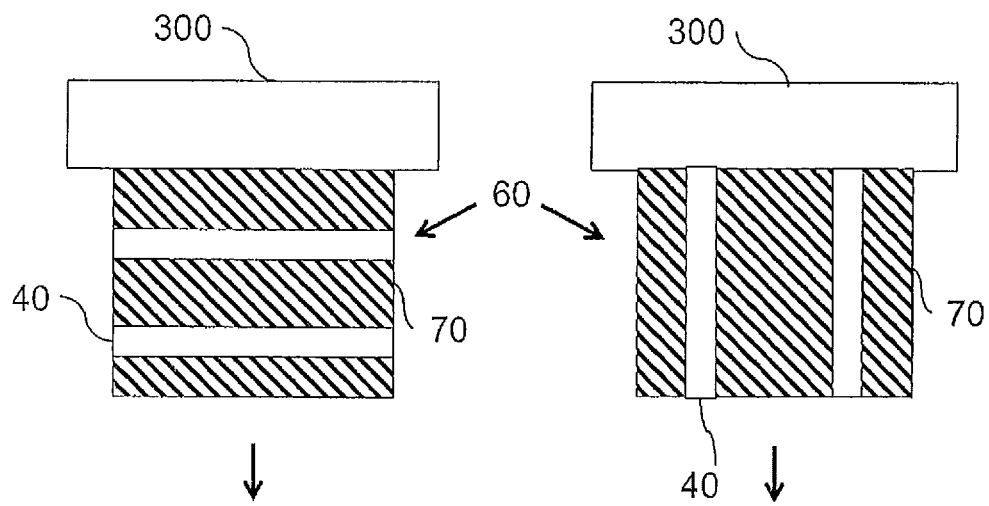
FIGS. 4A and 4B show methods for producing a conventional electrode material.
Figure 5:
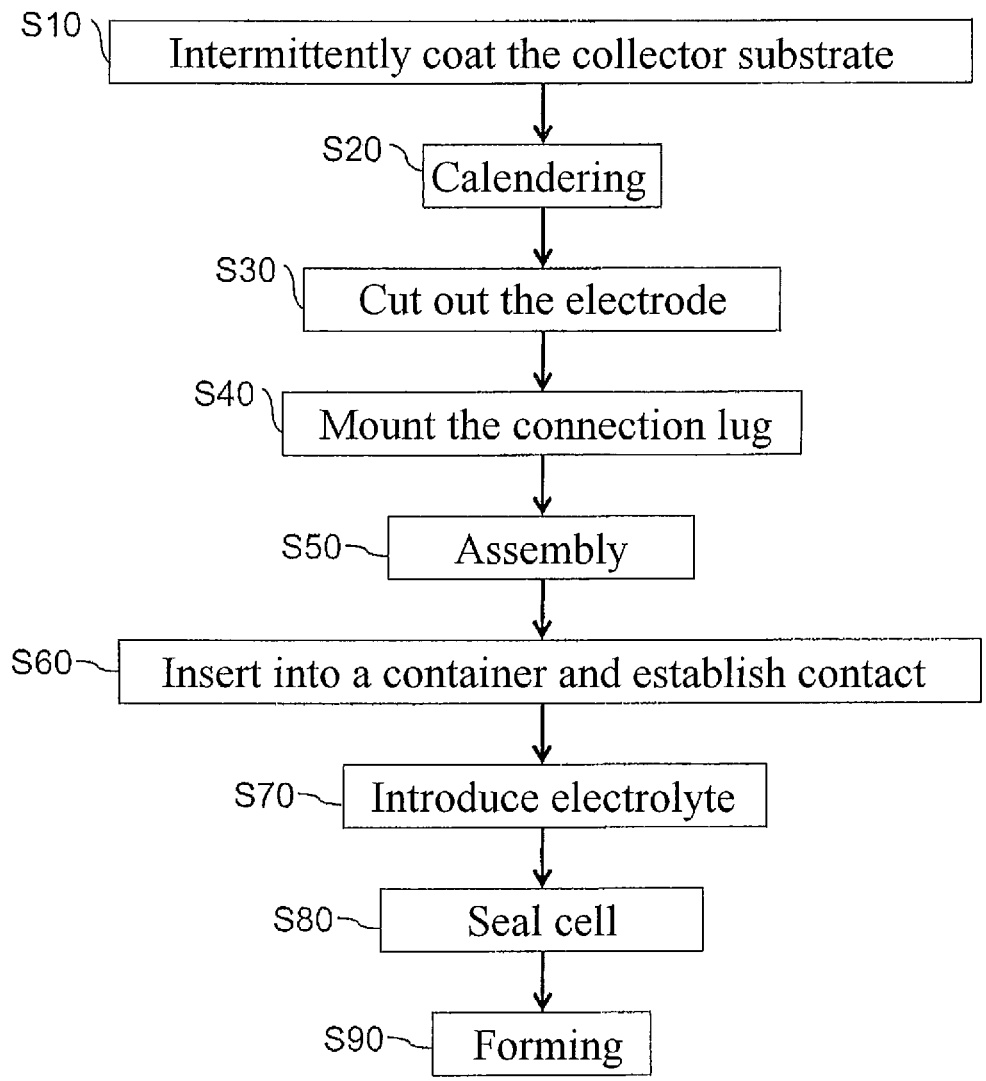
FIG. 5 shows a flowchart of a conventional production method for a battery.

The invention will be described below using the example of the lithium-ion battery which is distinguished by a high energy density and thermal stability. However, the present invention is not intended to be restricted to lithium-ion batteries but can be applied to any desired battery.

In a lithium-ion battery, a collector substrate 60 of an anode 10 is composed, for example, of copper which is coated with a coating film 70 which is composed of graphite, binder, carbon black and solvent. According to the present invention, the coating film 70 in an arrester region 40 is removed, with the result that the collector substrate 60 in the arrester region 40 is exposed. A connection lug 50, for example which is composed of nickel, can be mounted on the arrester region 40 of the anode 10. In the case of the cathode 20, a collector substrate 60 is composed, for example, of aluminum and is coated with a coating film 70 comprising an active material which contributes to a redox reaction, binder, carbon black, graphite and solvent. The connection lug of the cathode is preferably likewise composed of aluminum.

Figure 6:
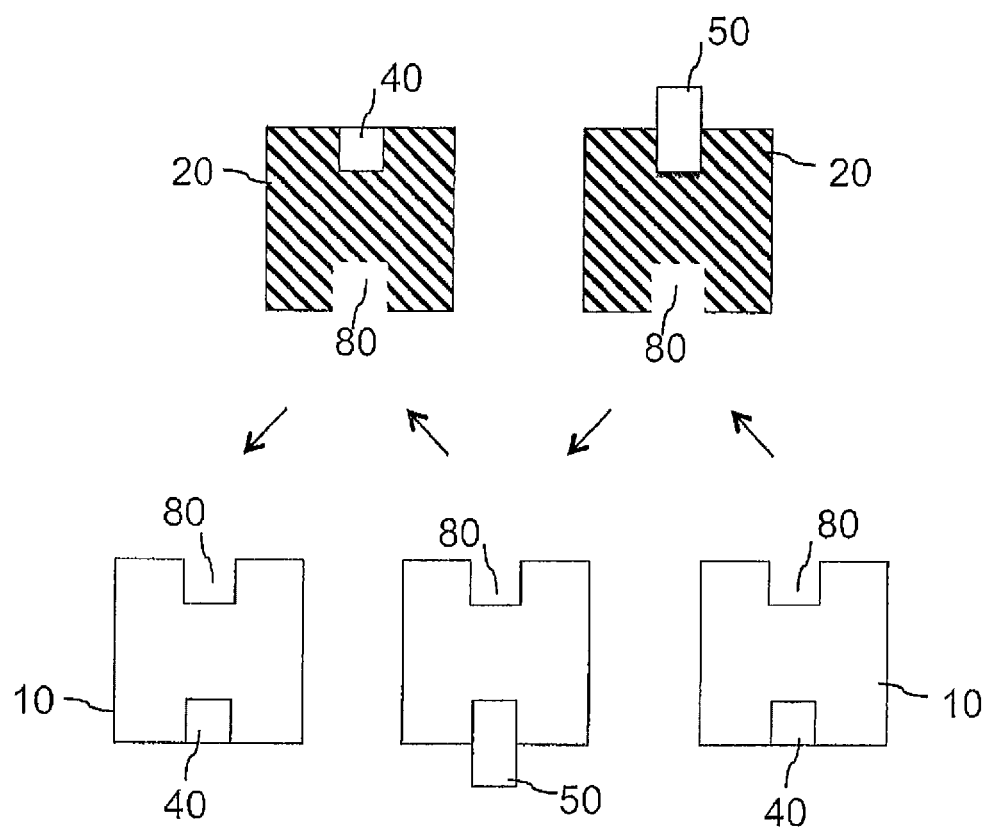
FIG. 6 shows battery electrodes according to a first exemplary embodiment of the present invention.

FIG. 6 shows battery electrodes according to the present invention in which an arrester region 40, at its circumference, predominantly adjoins the coating film 70 on the collector substrate 60. Both the anodes 10 and the cathodes have an internal arrester region 40 and a cutout 80. The cutout 80 is formed at a position which corresponds to the arrester region 40 of the respective electrode of a different kind in the assembled state. The cutouts 80 in the anodes 10 are consequently arranged such that they are situated above or below the arrester regions 40 of the cathodes 10 in the assembled state of the electrodes. The arrows in FIG. 6 indicate an electrode arrangement in the assembled state, wherein in each case an anode 10 and a cathode 20 are alternately arranged one above the other in each case. In this case, a separator 30 (not shown) is arranged between the anodes 10 and cathodes 20, it being possible for said separator to comprise microporous films or nonwovens. In the arrester regions 40, connection lugs 50 can be mounted in each case on at least one of the anodes 10 and on at least one of the cathodes 20 before the electrodes are assembled. However, the connection lugs 50 are preferably mounted on the arrester regions 40 after the electrodes are assembled, for example by ultrasonic welding. Since, in this exemplary embodiment, an arrester region 40 of an electrode is situated opposite a cutout 80 in an electrode of a different kind, in this case the anodes 10 and, respectively, the cathodes 20 can at the same time in each case be electrically connected to one another at their arrester regions 40.

It is also possible to form only the cathodes or only the anodes with an internal or inwardly projecting arrester region, wherein the other of the two electrodes is produced in accordance with the conventional method with a protruding arrester region.

Figure 7:
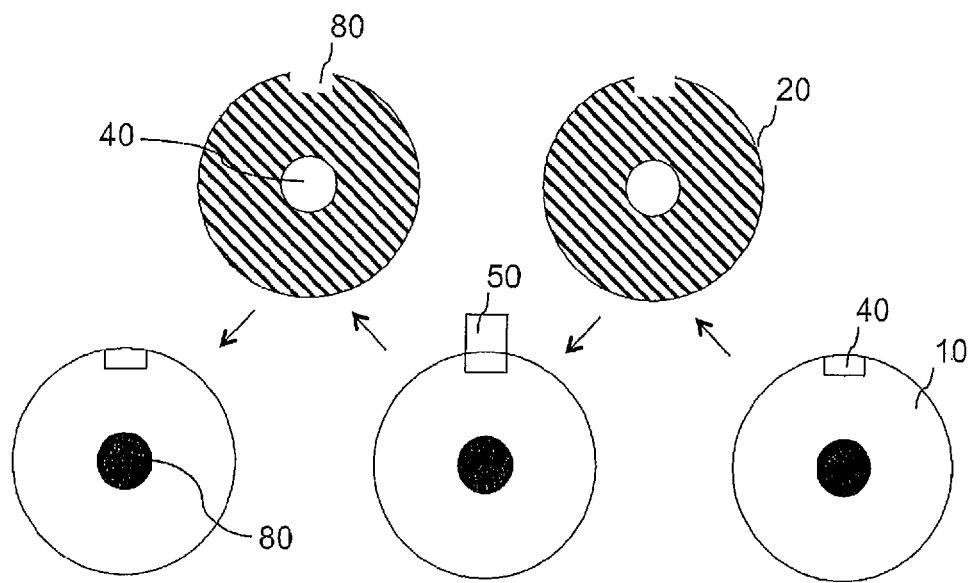
FIG. 7 shows battery electrodes according to a further exemplary embodiment of the present invention.

FIG. 7 shows a further exemplary embodiment of battery electrodes according to the present invention. The anodes 10 illustrated in FIG. 7 have a round cutout 80 in their center, whereas the cathodes 20 have a corresponding arrester region 40 in their center. The arrester region 40 of the anodes 10 is formed at its circumferential edge, with the result that the cathodes have a cutout 80 at this position. As described above, the arrester regions 40 of the electrodes of the same kind are connected to one another and connection lugs 50 are each mounted in the arrester regions 40 of the anodes 10 and the cathodes 20.

Figure 8:
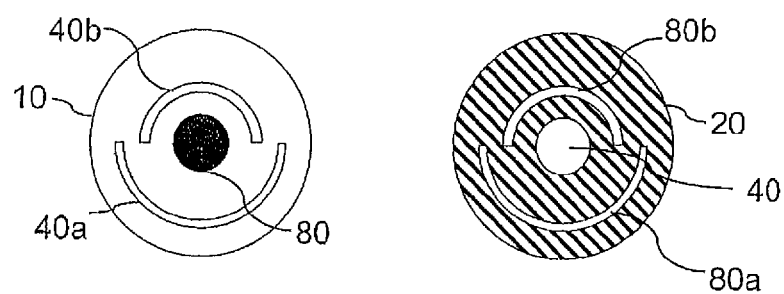
FIG. 8 shows battery electrodes according to another exemplary embodiment of the present invention.

FIG. 8 shows a further example of battery electrodes according to the present invention. In this exemplary embodiment, the arrester regions 40 are completely surrounded by the coating film 70. In this case, the anode 10 has two arrester regions 40a and 40b and the cathode 20 has two corresponding cutouts 80a and 80b. In this case, in each case one connection lug 50 is fitted to each of the two arrester regions 40a and 40b of the anode 10. Forming a plurality of arrester regions 40 on an electrode can lead to improved voltage dissipation and reduce a resistance.

Figure 9:
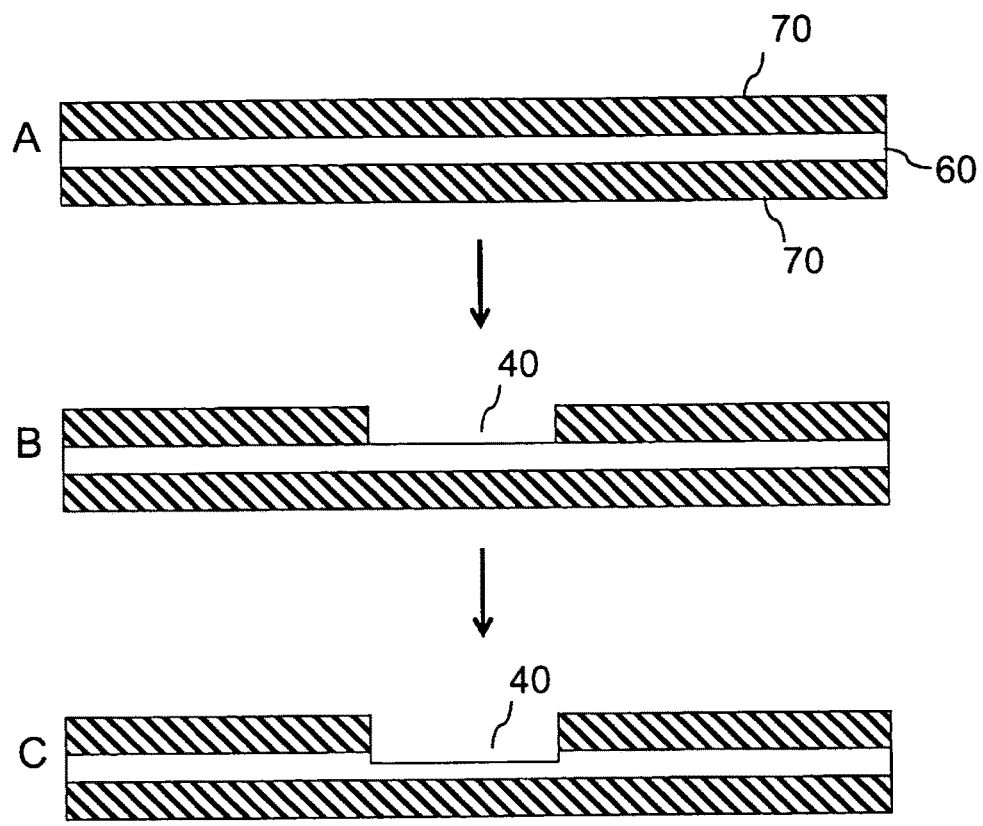
FIGS. 9A-9C show sectional views through an electrode material during a production process according to the present invention.

An exemplary method for producing the battery electrodes is explained below. According to the present invention, a collector substrate 60 is first, as shown in FIG. 9A, coated with a coating film 70 over a large surface area and on both sides. However, the collector substrate 60 can also be coated over a large surface area or substantially completely only on one surface. The coating film 70 is applied to the collector substrate 60 in a liquid state. Simple, continuous coating technologies, for example doctor blade, comma bar or kiss coating, can be used in this case. The coating film 70 is then dried or cured, wherein a thickness of the coating film 70 in the dry state is, for example, approximately 25 μm. After the coating film 70 has dried or cured, the coated collector substrate 60 is calendered in order to compress the coating film 70. On account of the uniform thickness of the collector substrate 60, the calendering process is simplified and can be carried out more efficiently, with the result that the quality of the electrode material is improved. Furthermore, the coated collector substrate 60 can be stored as rolled material and is available as electrode material for subsequent further processing.

As shown in FIG. 9B, at least one arrester region 40 is then formed on the coated collector substrate 60 by the coating film 70 in the arrester region 40 being removed by laser ablation and the collector substrate 60 which is situated beneath it being exposed. However, this is only one example of a production process of an arrester region 40. As an alternative, the arrester region 40 can also be produced by brushing, lithography and other methods. In the case of laser ablation, material is removed from the surface by being subjected to the action of laser radiation. By way of example, pulsed laser radiation with a high power density is used for this purpose. Since thermal conduction allows only very slow transportation of energy into the volume, the irradiated energy is concentrated on a very thin layer at the surface. As a result, the surface is heated to a great extent and the material is suddenly evaporated or fused. In order to ensure sufficient absorption of the laser light, a wavelength of the laser radiation is selected as a function of the material which is to be removed. An engraving or cutting laser system is preferably used, for example with an ytterbium fiber laser with a wavelength of 1070 nm. However, other gas, solid or fiber lasers can also be used. During the laser processing process, a process gas or blowing gas can also be conducted onto the surface in order to drive the removed material out of the kerf or to prevent undesired chemical reactions at the surface. The process gas is preferably cold in order to cool the electrode material during laser processing. No harmful impurities are generated by the material being evaporated or fused.

Since the arrester regions 40 are produced by laser ablation, any desired arrester region shapes and arrangements can be formed. In particular, the arrester regions 40 can be arranged on the electrode surface such that they do not protrude from the battery electrode. As a result, an energy density/volume ratio can be increased and the size of a battery can be reduced given the same electrical properties. The arrester region 40 is formed preferably immediately before electrodes of the same kind are connected or a connection lug 50 is fitted in the arrester regions 40. By way of example, electrodes of the same kind which are situated one above the other can be connected to one another by a welded contact in the arrester regions 40. In this case, a connection lug 50 can be mounted on one of the arrester regions 40 at the same time. Since the arrester regions 40 are only formed shortly before the electrode material is further processed, a fresh, clean surface is available for establishing contact between the electrodes of the same kind and for fitting the connection lug 50. As a result, passivation layers, for example oxidized surfaces and other impurities, in the arrester region 40 can be avoided.

It is possible for not only the coating film 70 in the arrester region 40, but also, as shown in FIG. 9C, a thin layer of the collector substrate 60, to be removed by means of laser. By virtue of the use of laser systems with a high level of cutting precision, the penetration depth of the laser can be exactly controlled, with the result that the depth of the material removal can be selected as desired. Therefore, a collector substrate 60 in the arrester region 40 can be thinned down in a targeted manner. In addition, the surface condition for making electrical contact can be improved as a result.

Figure 10:
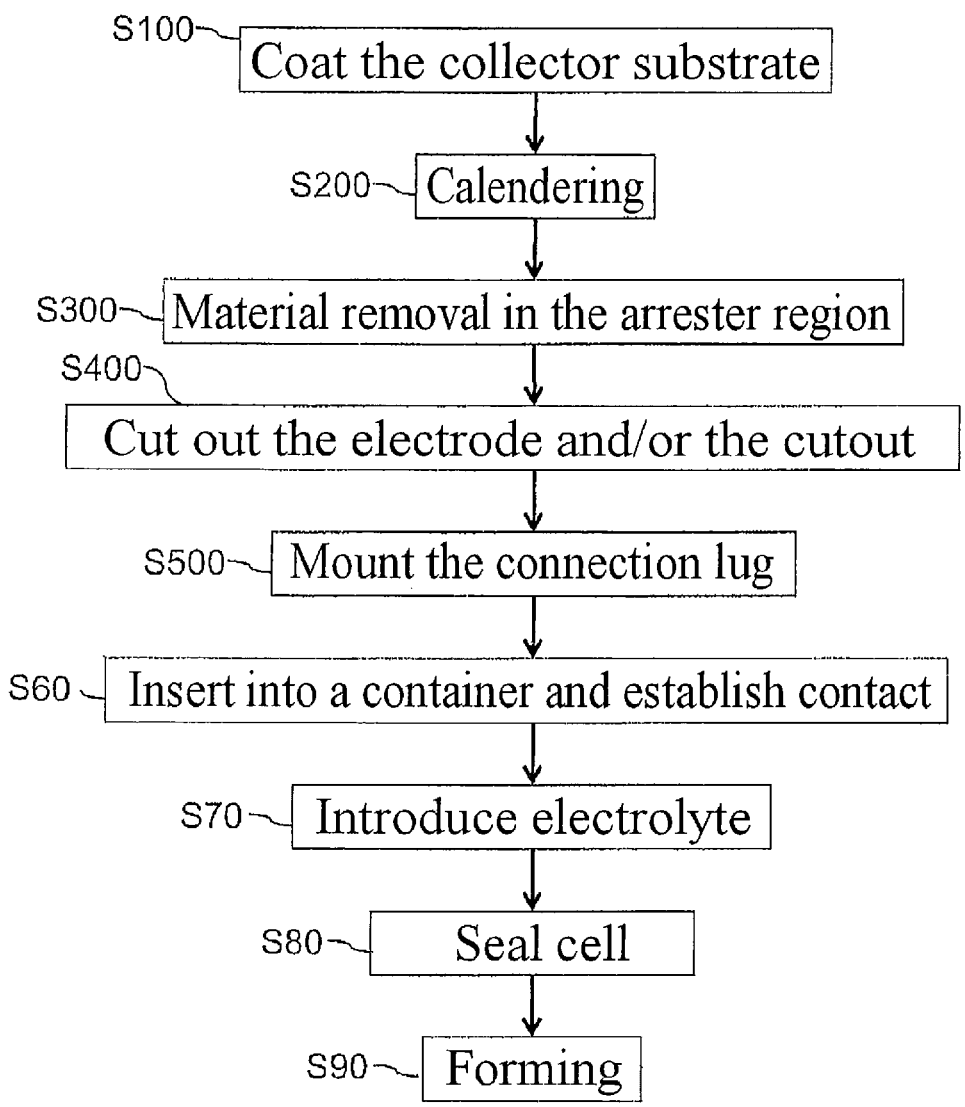
FIG. 10 shows a flowchart of a production method according to an exemplary embodiment of the present invention.

FIG. 10 shows a flowchart of a production process of a battery according to the present invention. First, an ink-like coating film 70 is applied over a large surface area or virtually completely on a collector substrate 60 which comprises a metal strip which is approximately 8-20 µm thick (S100). After the coating film 70 which is approximately 25 µm thick in the dried state has dried or cured, the uniformly coated collector substrate 60 is calendered (S200) in order to remove cavities and irregularities, which were produced during drying, from the coating film 70. The calendered and coated collector substrate 60 can now be stored as rolled material until it is further processed. In order to finish the battery electrode, the coating film 70 in a prespecified arrester region 40 on the coated collector substrate 60 is removed by laser ablation (S300). A thin layer of the collector substrate 60 in the arrester region 40 may additionally be removed in order to improve a surface quality for making electrical contact. In the next step S400, the electrode and possibly the cutouts 80 is/are cut out of the coated collector substrate 60 in a desired shape.

The electrode or the cutout 80 is preferably cut out by laser, but, as an alternative, a stamping apparatus can also be used. The order of steps S400 and S300 can also be interchanged. Anodes 10 and cathodes 20 are then arranged alternately one above the other such that the arrester regions 40 of electrodes of the same kind are situated opposite one another in each case, wherein the cutouts 80 in the cathodes 20 are arranged between the arrester regions 40 of the anodes 10, and vice versa. The arrester regions 40 of electrodes of the same kind are then in each case connected to one another, for example by ultrasonic welding, wherein in each case one connection lug 50 is mounted on said arrester regions (S500). As an alternative, the connection lug 50 can also be fitted in each case to one of the cathodes 20 or anodes 10 before the electrodes are assembled.

The further steps correspond to those of the conventional method for producing a battery. The electrode arrangement is inserted into a container and the connection lugs 50 are connected to the outer voltage poles of the battery (S60). An electrolyte is then introduced (S70) and the cell is sealed (S80). Finally, forming (S90) is carried out.

According to the present invention, the arrester regions can be formed such that they do not protrude from an outer circumference of the battery electrode, but rather project inwardly into a coated region of the battery electrode. As a result, a higher capacity and energy density can be achieved given the same battery size.

The invention claimed is:

1. A battery electrode comprising:
a collector substrate having a predetermined area;
a coating film formed by an active material, including graphite, binder and carbon black on a first side of the collector substrate, the coating film having a uniform thickness and fully covering the predetermined area and forming a coated region of the collector substrate;
at least one arrester region on the first side of the collector substrate, the at least one arrestor region projecting into the predetermined area or being arranged within the predetermined area of the collector substrate, including the coating film, the at least one arrestor region being formed by removing the coating film from the first side of the collector substrate, thereby forming a clean surface of the collector substrate free of impurities and oxidized layer, wherein the collector substrate has a thinner thickness in the arrestor region than in the coated region; and
at least one cutout region that projects inwardly into the coated region of the collector substrate or is formed within the coated region of the collector substrate, the at least one cutout region being created by cutting out a portion of the collector substrate and the coating film in which at least one arrestor region and at least one cutout region are disposed in alignment with one another on the electrode and in which only the at least one arrestor region is configured to receive a connection lug, wherein the connection lug is attached to the clean surface of the collector substrate in the at least one arrestor region, and wherein the battery electrode is configured to be situated opposite an electrode of a different kind so that the at least one arrestor region of the battery electrode is situated opposite a cutout region of the electrode of the different kind and the at least one cutout region of the battery electrode is situated opposite an arrestor region of the electrode of the different kind.

2. The battery electrode as claimed in claim 1, wherein at least half a circumference of the at least one arrester region adjoins the coated region.

3. The battery electrode as claimed in claim 1, wherein at least a portion of the at least one arrester region has a substantially rectangular, triangular, circular or annular form.

4. The battery electrode as claimed in claim 1, wherein the at least one arrester region, at its circumference, is completely surrounded by the coated region.

5. The battery electrode as claimed in claim 1, wherein the at least one arrester region is produced by laser ablation of the coating film.

6. The battery electrode as claimed in claim 1, wherein the battery electrode or the at least one cutout region is cut out by laser cutting.

7. A battery which contains at least one battery electrode as claimed in claim 1.

8. A method for producing a battery electrode comprising the steps of:
providing a collector substrate having a predetermined area;
coating a liquid coating film on a first side of the collector substrate, the liquid coating film being formed from an active material including graphite, binder, carbon black and solvent, the liquid coating film having the consistency of ink during the coating step;
drying, curing and calendaring the liquid coating film on the collector substrate, forming a film coated region on the collector substrate having a uniform thickness that fully covers the predetermined area of the collector substrate;
forming at least one arrester region on the first side of the collector substrate by removing the film coated region in the at least one arrester region from the first side of the collector substrate as well as a layer of the first side of the collector substrate, thereby forming a clean surface of the collector substrate free of impurities and oxidized layer, wherein the collector substrate has a thinner thickness in the at least one arrester region than in the film coated region of the collector substrate, wherein the at least one arrestor region is projecting into the predetermined area or is arranged within the predetermined area of the film coated region of the collector substrate;

forming at least one cutout region in the collector substrate that projects inwardly into the film coated region of the collector substrate or is formed within the film coated region of the collector substrate, the at least one cutout region being created by cutting out a portion of the collector substrate and the coating film and in which each of the at least one arrestor region and at least one cutout region are formed in alignment with one another and in which only the at least one arrestor region is configured to receive a connection lug, wherein the battery electrode is configured to be situated opposite an electrode of a different kind so that the at least one arrestor region of the battery electrode is situated opposite a cutout region of the electrode of the different kind and the at least one cutout region of the battery electrode is situated opposite an arrestor region of the electrode of the different kind; and attaching the connection lug to the clean surface in the at least one arrestor region.

9. The method as claimed in claim 8, further including forming the at least one arrester region wherein at least half a circumference of the arrester region is surrounded by the film coated region.

10. The method as claimed in claim 8, further comprising removing the film coated region in the at least one arrester region using laser ablation.

* * * * *